United States Patent Office 2,960,655
Patented Nov. 15, 1960

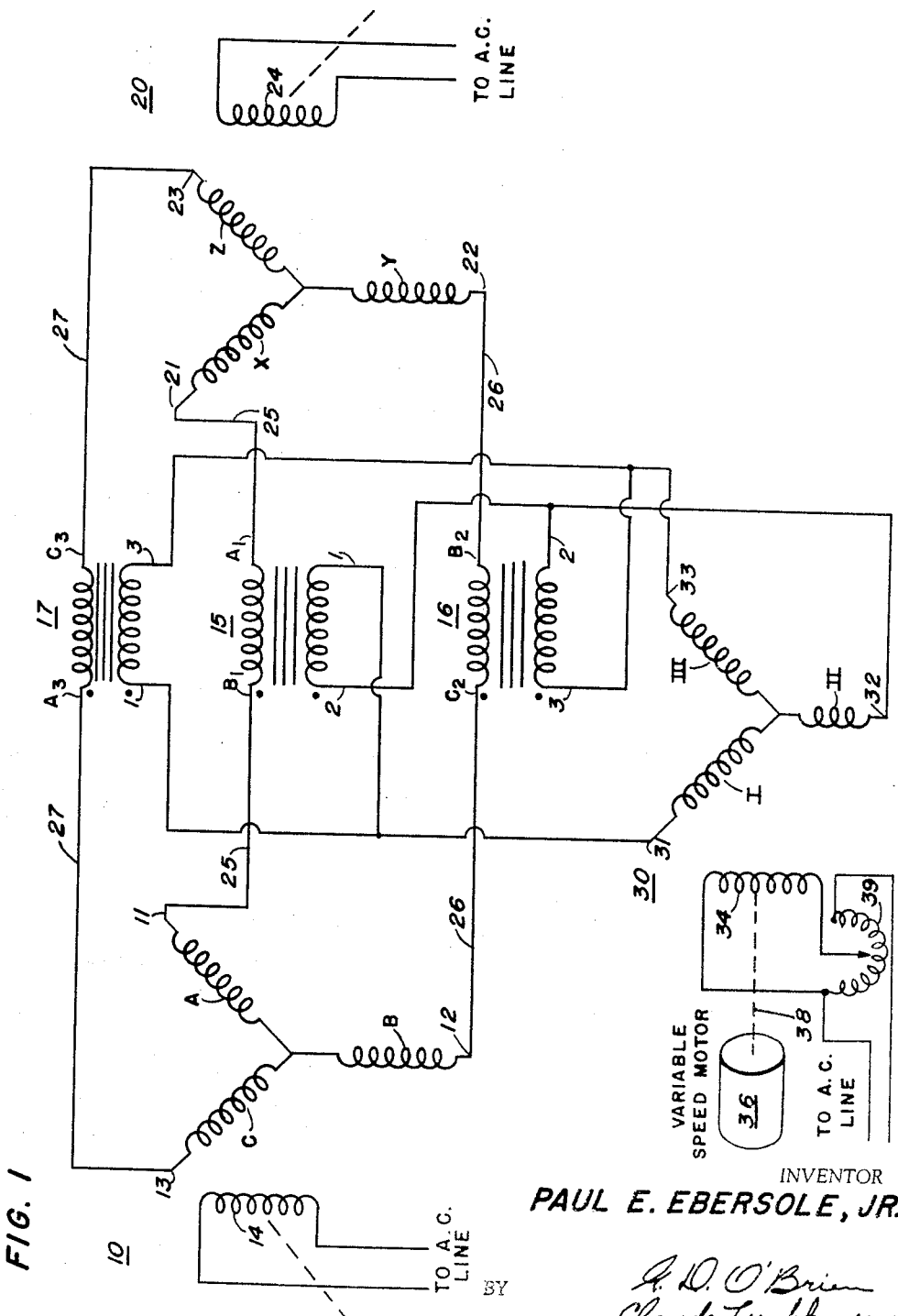

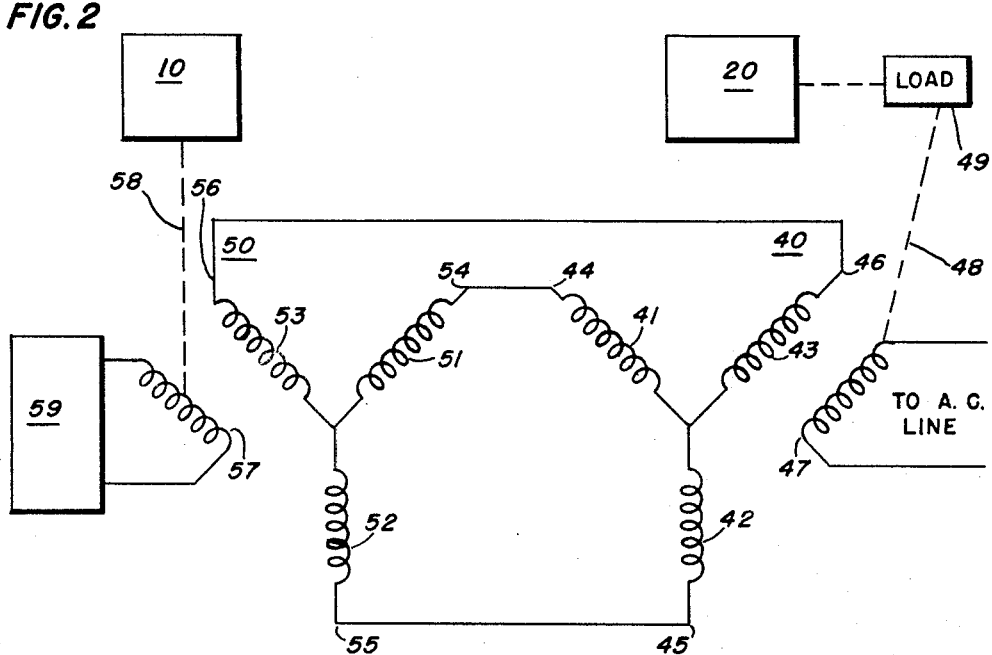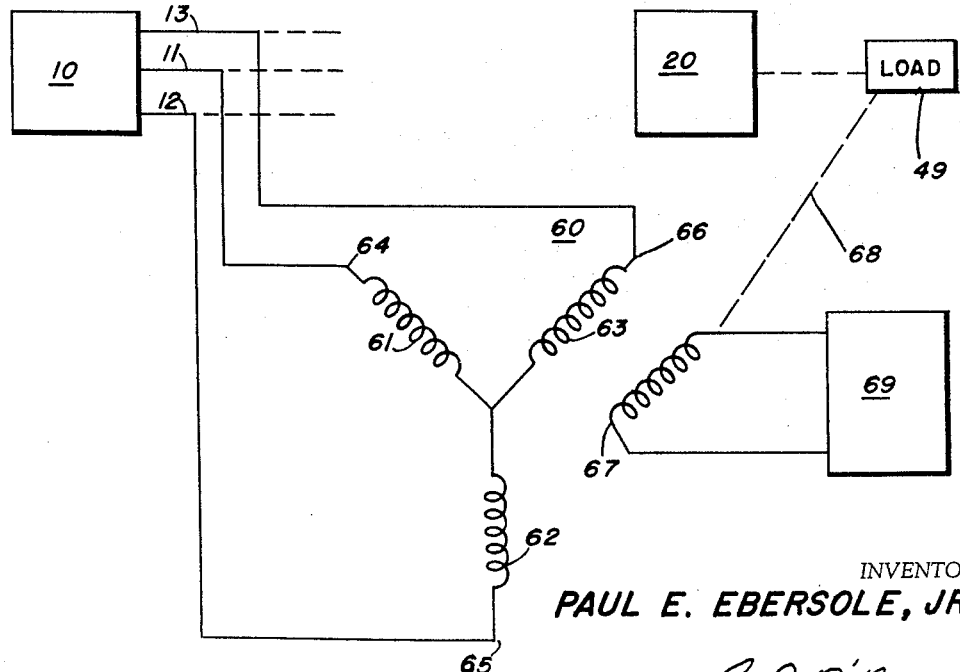

2,960,655
SINE WAVE GENERATOR

Paul E. Ebersole, Jr., Arlington, Va., assignor to the United States of America as represented by the Secretary of the Navy Filed Nov. 21, 1958, Ser. No. 775,659

5 Claims. (Cl. 324—158)

(Granted under Title 35, U.S. Code (1952), sec. 266)

The invention described herein may be manufactured and used by or for the Government of the United States of America for governmental purposes without the payment of any royalties thereon or therefor.

This invention relates to a sine wave generator and more particularly to an apparatus for inserting a sine wave signal of adjustable frequency in the remote control lines of synchro power drive equipment.

In the construction and test of electrical power drive equipment, including generally a synchro transmitter and receiver, it is frequently important to ascertain the frequency response of the system in changing from one speed of operation to another or alternatively under continuously changing speed conditions. It is also necessary to determine the resonant frequencies of a whole system including the load.

It would be desirable to determine the frequency response of the system while the power drive system is actually operating or turning at a given velocity, i.e., while the power drive is in dynamic operation. The voltages present at such a time in the interconnections between a synchro transmitter and a synchro receiving apparatus may be termed constant velocity signals. Prior attempts to combine with such constant velocity signals a sinusoidally varying signal to produce oscillatory motion of the load for frequency analysis purposes have not altogether met with success. Mechanical devices have been employed to create the oscillatory signal and have included devices such as Scotch yokes and crossheads for converting linear motion into rotary motion. A disadvantage inherent with these units is that an accurate sine wave, necessary for accurate frequency analysis purposes, is not generated thereby. Backlash is magnified by the necessity to convert linear motion to rotary motion and the backlash gives rise to spurious signals masking the desired information.

It is accordingly an object of this invention to provide an improved apparatus for accurate frequency response analysis of synchro controlled power drive equipment.

It is another object of this invention to provide an improved apparatus for combining in serial relation a preselected velocity signal and a small sinusoidal signal of adjustable amplitude and frequency for application to a synchro receiving apparatus.

It is another object of this invention to provide an improved apparatus in series between a synchro transmitter and a synchro receiver for adding serially to the conventional synchro signals a sinusoidal signal for increasing and decreasing the synchro signals in a sinusoidal manner and which is adjustable in frequency, phase, and amplitude relative to such synchro signals, for purposes of frequency response analysis of the synchro system and load.

Other objects and many of the attendant advantages of this invention will be readily appreciated as the same becomes better understood by reference to the following detailed description when considered in connection with the accompanying drawings wherein:

Fig. 1 is a schematic diagram of a circuit according to the present invention;

Fig. 2 is a schematic diagram of a circuit attendant to the present invention for detecting errors in the frequency response of a power drive system; and Fig. 3 is a schematic diagram of an alternative circuit for registering errors in the frequency response of a power drive system.

In accordance with the invention, there is provided in the leads between a synchro transmitter stator and a synchro receiver stator or other responsive device a plurality of transformer secondaries. Each of these secondaries is inductively associated with a primary inducing a voltage in the corresponding secondary additive (or subtractive as the case may be) with the voltage already present in the leads. The primaries of the afore-mentioned transformers are energized from a source of varying voltage which maintains the same voltage variation phase difference between each of the primaries as is normally between the corresponding secondary leads. Apparatus is provided to adjust the primary voltages in amplitude and frequency. Voltage variation signals of a variable amplitude and frequency, but of constant phase interrelationship, are thereby serially added to the voltages produced by the synchro transmitter. The frequency adjustability of these added signals facilitates the frequency response analysis of the system under test.

Referring to Fig. 1, a synchro transmitter 10 has a rotatable rotor shown diagrammatically at 14 connected to a common A.C. line and inductively related to a "three-phase" stator comprising phase windings A, B, and C. The stator is connected in Y having a common neutral connection and having respective output connections 11, 12, and 13.

A synchro receiver is composed of a rotatable rotor shown diagrammatically at 24 connected to the common A.C. line, and a "three-phase" stator winding including phase windings X, Y, and Z connected in Y and having respective input connections 21, 22, and 23. Output connections 11, 12, and 13 of the stator winding of transmitter 10 are generally connected respectively to input connections 21, 22, and 23 of receiver 20 through transmission lines 25, 26, and 27. As will be appreciated by those skilled in the art, rotor 24 of receiver 20 will assume a physical position relative to stator windings X, Y, and Z substantially identical to the physical position of rotor 14 of transmitter 10, providing the rotor windings are similarly connected to the common A.C. line. For purposes of the present invention, it is understood that synchro receiver 20 could be replaced by a similarly connected control transformer having a servo follow-up system by which to position its rotor. In such an instance rotor 24 could no longer be connected to the common A.C. line but rather to the input of a servo system (not shown).

Transformers 15, 16, and 17, each having primary and secondary windings have their secondary windings connected serially in transmission lines 25, 26, and 27, respectively. Transformer secondary B1—A1 of transformer 15 is connected serially in that order in transmission line 25, transformer secondary C2—B2 of transformer 16 is connected serially in transmission line 26, and transformer secondary A3—C3 of transformer 17 is connected serially in transmission line 27. Terminals B1, C2, and A3 are thereby electrically connected to terminals 11, 12, and 13, respectively of transmitter 10.

Synchro generator 30 of the present invention is employed to generate small sinusoidal variations for adding to the transmitter voltages in order to secure a resultant at the receiver which comprises servo control voltages with sinusoidal variations. Generator 30 includes a rotor diagrammatically represented at 34 driven by adjustable variable speed motor 36 through shaft 38. Rotor 34 is electrically coupled to the common A.C. line through a variable tap on variable transformer or Variac 39. The stator of generator 30 is composed of "three-phase" windings I, II, III, having a common neutral connection and having output connections 31, 32, and 33, respectively. Output terminal 31 connects to primary terminal 1 of transformers 15 and 17. Output terminal 32 connects to terminal 2 of transformers 15 and 16. Output terminal 33 connects to terminal 3 of transformers 16 and 17. It is apparent that the primaries of transformers 15, 16, and 17 form a delta arrangement between common terminals 1, 2, and 3. As will become more apparent hereinafter, when phase windings A, B, and C of the transmitter are connected by means of transmission lines to phases X, Y, and Z, respectively of the receiver, and with corresponding phases I, II, and III of the generator drive transformers having their primaries delta connected as shown, the voltages induced in the secondaries of these transformers included serially in the transmission lines will be in identically additive relationships, providing the rotors of all three machines are connected to a common A.C. line. It thereby becomes possible to introduce a small sine wave signal for frequency response testing purposes into the synchro system. Its frequency is determined by the relative speed of the variable speed motor 36.

Referring now to Fig. 2, showing means for detecting the frequency response in a system having the sinusoidal frequency injected by the apparatus of Fig. 1, the same synchro transmitter is represented by block 10 and is taken to be at a control point remote from the load 49, which is to be controlled. Synchro receiving apparatus 20 receives control voltages from the synchro transmitter by means of the connections and apparatus shown in Fig. 1, and drives the physical load 49. Also coupled physically to the load or by means of shaft 48 is the rotor 47 of a synchro transmitter 40. Said rotor 47 is also connected to the common A.C. line of the system mentioned in regard to Fig. 1. Synchro transmitter 40 has "three-phase" stator windings including windings 41, 42 and 43 having a common neutral connection and respective output connection 44, 45 and 46. These output connections are wired respectively to input connections 54, 55 and 56 of stator windings 51, 52 and 53 of control transformer 50 located at the remote control point. The stator windings 51, 52 and 53 are also interconnected in a "three-phase" arrangement. The rotor 57 of control transformer 50, inductively related to the stator thereof, is physically rotated by means of shaft 58 coupled to synchro transmitter 10 at the control point. Rotor 57 is electrically arranged to drive metering or recording device 59 which registers any variance between the physical angular position of the transmitter 10 and the load 49.

Fig. 3, showing an alternative means for registering error between synchro transmitter and load positions to ascertain the frequency response characteristics of the system, includes a control transformer 60 having a rotor 67 physically rotatable in synchronism with load 49 by means of shaft 68 and electrically connected to error metering or recording device 69. Control transformer 60 also includes a rotor having "three-phase" windings 61, 62, and 63 having a common neutral connection and output connections 64, 65, and 66 respectively connected to output terminals 11, 12, and 13 of the transmitter stator at the remote control point. As in Fig. 2 the error metering or recording device 69, this time located at the load position, is employed to ascertain the frequency response characteristics of the system which has the sine wave modulation signal added to the synchro transmitter signal as hereinbefore set out.

In operation the apparatus of Fig. 1 provides for rotation of rotor 24 in relative synchronism with rotor 14 located at the control point. As rotor 14 rotates at a constant speed, for example, it induces A.C. voltages of varying magnitude and sign in stator windings A, B, and C, depending instantaneously upon the relative alignment of rotor 14 with the said windings A, B, and C. The voltages induced in stator windings A, B, and C vary cyclically each one varying between a positive maximum and a negative maximum as the rotor rotates. It is to be noted that the variations of these voltages will be out of phase with one another by an angle dependent upon the physical displacement of these windings relative to one another. In a "three-phase" type symmetrical arrangement, these cyclical variations produced by a turning rotor will be 120° apart. These varying voltages are coupled to the stator of synchro receiver 20 by means of transmission lines 25, 26, and 27 where they are applied respectively to windings X, Y, and Z, such that the identical voltages appear across phase windings X, Y, and Z (but for the additional voltages induced in the secondary winding transformers 15, 16, and 17). As will be appreciated by those skilled in the art, the rotor 24 of synchro receiver 20 which is inductively related to the afore-mentioned stator windings, and fed from an A.C. line common to it and rotor 14, will assume an angular position substantially identical to that of rotor 14 of the transmitter due to the electromagnetic forces acting upon rotor 24 produced by phase windings X, Y, and Z. The rotor 24 will seek a null or balance position such that the electromagnetic effects of windings X, Y, and Z and winding 24 cancel one another out for substantially zero torque at the receiver output shaft.

In operation, according to the present invention, rotor 14 of synchro transmitter 10 is rotated at a constant angular velocity to simulate dynamic operation of the system, while a physical load is driven directly, or indirectly through a servo system, by means of the rotor 24 of the synchro receiver. In order to add oscillatory signals to the synchro voltages in transmission lines 25, 26, and 27, transformer secondary winding B1—A1 is inserted in line 25, transformer secondary C2—B2 is inserted in line 26, and secondary A3—C3 is inserted in line 27 as shown. Terminal 2 of the primary of transformer 15 is arranged to be in phase with terminal B1 of the secondary. Likewise, terminal 3 of the primary transformer 16 is arranged to be in phase with the terminal C2 of the secondary of transformer 16 and terminal 1 of the primary of transformer 17 is arranged to be in phase with terminal A3 of the secondary of transformer 17.

A synchro generator 30 is provided which is similar in its arrangement of windings to synchro transmitter 10 and synchro receiver 20, having stator windings located 120 electrical degrees apart. Assuming for the moment that its rotor 34 is aligned at the same instantaneous angular position relative to its stator windings as are the rotors of the synchro transmitter and the synchro receiver relative to their stator windings, voltages will be induced in the stator winding of the generator which are similar in their ratio one to another as are the voltages in the stator windings of synchro transmitter. These phase windings of the generator are designated I, II, and III and correspond in the relative magnitudes of the voltages induced therein at the afore-mentioned rotor position to the voltages induced in windings A, B, and C of the synchro transmitter. To draw an analogy again to a three-phase winding arrangement, the primaries of the afore-mentioned transformers are connected in delta and each one has the same phase relationship to the voltage variations present in its corresponding line as do each one of other transformer primaries. A vector diagram would show that each of the voltages induced in the respective secondaries of the transformers have an identical angular relationship to each of the respective voltages already in the lines and that these voltages add vectorially to those produced by the synchro transmitter, each in the same manner.

Now as variable speed motor 36 rotates rotor 34 at a preset constant speed, the voltages in the stator of generator 30 vary sinusoidally and cyclically in a direction dependent upon the direction of rotation of the variable speed motor 36, and each of the voltages produced by the stator of generator 30 successively add and subtract to the voltages in the transmission lines in a cyclical and orderly fashion, the sum of the voltages in each of the transmission lines reaching receiver 20 going through said additional cyclical variations, the variations in each of the said lines being displaced in time from the previously numbered line by one third of the time it takes for motor 36 to make a complete revolution. The voltages added in the transmission lines are adjusted in magnitude by means of Variac 39 to an amount relatively small in comparison to the voltages in the lines due to synchro transmitter 10. The cyclical variation is introduced at the synchro receiver 20 which causes it to oscillate about a point, otherwise dictated by rotor 14 at the remote transmitter, and to produce such oscillation in the load. The frequency of such oscillation is controlled by adjusting the speed of variable speed motor 36 to any preset amount, relative to the speed of rotor 14, so that a complete frequency response test can be run including all ranges of physical oscillation of the load and system. The test is carried on with the system under dynamic operations, i.e., while the synchro system and load are being operated at a selected angular velocity as controlled by rotor 14. Thus, the oscillation or shaking of the system and load takes place as the system and load are rotating, simulating actual dynamic conditions. Frequency response, or reaction of the system to various signal changes may be analyzed. Various resonant frequencies of the system may also be detected and corrected for.

The apparatus of Figs. 2 and 3 are used to detect or plot a graph of the system response with the recording or metering devices indicated at reference numeral 59 in Fig. 2 or reference numeral 69 in Fig. 3. A number of common recording devices may be used for the latter purpose. The arrangement shown in Figs. 2 and 3 permits a signal to be read at the recorders indicating the angular displacement between the control transmitter 10 and the load 49. Such recorders may employ an amplification device so that minute discrepancies between transmitter and load can be detected. In each of Figs. 2 and 3 the recorder is fed from the rotor of a control transformer which is employed to detect the angular differences. In Fig. 2 this control transformer is conveniently located at the control point together with recorder 59, while in Fig. 3 the recorder and control transformer are located at the load. In either case angular position is fed into the rotor of the control transformer and electrical position is fed into the stator thereof. If the two are identical no output is produced in the rotor feeding the recorder. However, if there is some discrepancy, which will usually be the case, such discrepancy will be recorded.

During complete test operation employing the whole apparatus, the recording device is connected as shown alternatively in either Figs. 2 or 3 and the transformer hookup of the present invention is connected to the synchro power drive system as illustrated and described in connection with Fig. 1. For a given test the synchro transmitter 10 is caused to operate by a physical drive at some angular velocity simulative of the usual angular velocity at which the system is required to operate. A voltage is selected at the Variac 39 to produce an amplitude of oscillation which is a fraction of the signal present in the transmission lines of the synchro system. Then as the recorder continues to make a record or indication, the speed of motor 36 is set to various speeds from substantially the same speed as that of rotor 14 through speeds much greater than (or less than) such a speed. An oscillation is thus introduced into the system having a frequency equal to the difference in r.p.m. between motor 36 and rotor 14. A constant oscillation of the load as indicated on the recorder will illustrate more or less satisfactory operation while a drastic increase in such oscillation would indicate a resonant frequency of the system. Likewise, the speed of response and accuracy of the response will be charted according to how accurately the load is able to follow the oscillations introduced into the system.

It is thus seen that the present invention provides a novel means to introduce into a synchro drive arrangement during its operation a sine wave oscillatory signal variable in amplitude and frequency which may be used to analyze the frequency response characteristics of a synchro system. The present invention produces such oscillations for frequency response determination heretofore obtained mechanically, with the present advantage of greatly increased accuracy of analysis and greatly increased control of oscillation.

Obviously many modifications and variations of the present invention are possible in the light of the above teachings. It is therefore to be understood that within the scope of the appended claims the invention may be practiced otherwise than as specifically described.

What is claimed is:

1. In an apparatus for transmitting shaft rotation from one point to another including a synchro transmitter, a synchro receiver and a plurality of connections therebetween, a circuit for causing small additional sinusoidal variations of a predetermined frequency to be present at the receiver comprising, a plurality of transformers each having a primary winding and a secondary winding and having their secondary windings serially inserted in said connections, wiring means for supplying sinusoidal alternating current, a synchro generator having first and second relatively rotatable inductive windings whose mutual inductance varies with rotation, a variable transformer receiving alternating current from said wiring means and producing an adjustable output, means applying said adjustable output to said first winding, means connecting said second winding to each of said primary windings, an adjustably variable speed motor driving said generator for relatively rotating said first and second windings to produce a varying signal serially applied to the voltages in said connections which signal amplitude varies at a frequency dependent upon the speed of said motor, and means to measure the difference in shaft rotation between said synchro transmitter and said synchro receiver.

2. In an apparatus for transmitting shaft rotation from one point to another, a synchro transmitter having a rotor and a stator, said rotor being adaptable to physically receive angular positional information, said stator having a plurality of interconnected phase windings, a synchro receiver for controlling a load including a stator having a plurality of interconnected phase windings corresponding to those of the synchro transmitter, a plurality of transmission leads between the said transmitter and receiver connecting corresponding points of corresponding phase windings in said transmitter and receiver stator windings, and a plurality of signal adding transformers having primary and secondary windings, said secondary windings being serially interconnected one each in one of said transmission leads, a synchro generator having a rotor winding and having a stator winding corresponding to the stator windings of said transmitter and said receiver, said stator windings being interconnected in the same manner as stator windings of said transmitter and said receiver, wiring means connecting corresponding points in said generator stator winding to the primaries of said transformers whose secondary windings are serially connected for vectorial addition of the signals from said generator to voltages present in said transmission lines, a variable speed motor having a driving connection with said synchro generator for rotating said generator to produce a generator output whose amplitude varies at a frequency dependent upon the speed of said variable speed motor, means for supplying sinusoidal alternating current from a common source to the rotors of said transmitter, said receiver and said generator, and means to measure the difference in shaft rotation between said synchro transmitter and said synchro receiver.

3. The apparatus of claim 2 wherein the stators of said transmitter and said receiver are identical Y-connected three-phase windings having mutual connections and having corresponding phases interconnected by means of said transmission lines each having the secondary of one of said transformers located serially therein, and wherein said synchro generator is a similarly Y-connected three-phase winding having a common mutual connection and having the phases thereof connected to the primaries of said transformers, the primaries of said transformers being connected in a delta aiding relationship to the currents in said transmission lines when the rotors of said transmitter, said receiver and said generator are similarly aligned.

4. In a servo system including a transmitting device having a plurality of output leads whose relative alternating current outputs vary in accordance with the angular information set into said transmitting device, said transmitter being adapted to thus vary the amplitude of its outputs in an out of phase relation having fixed phase difference between the variations of the various outputs, a receiving device having a similar number of input leads, said receiving device being positionable in accordance with relative sign and amplitudes of signals received on said input leads, and having transmission lines joining selected ones of said output leads to selected ones of said input leads, a circuit for causing additional sinusoidal variations comprising, a transformer associated with each of said transmission lines having a primary winding and a secondary winding, the secondary winding being serially interconnected with the associated transmission line, means for applying small alternating current signals to the primaries of said transformers wherein an amplitude and sign difference exists between said signals, means for altering the sign and amplitude of each of said signals employed at the primaries of said transformers at a predetermined sinusoidal rate of change, the sinusoidal rate of change of said signals being out of phase each with the other by fixed amounts corresponding to said fixed phase differences, and measuring means connected to said system for deriving information therefrom.

5. The apparatus as set out in claim 4 where said means for applying small alternating current signals is a synchro generator having a rotor primary winding and a multiphase stator secondary winding having output connections for coupling alternating current signals to the primaries of said transformers, a variable speed motor having a mechanical driving connection with the rotor of said generator to produce the rapid change of said signals, a variable auto-transformer having a winding and a tap thereon, wiring means providing alternating current across said winding, and wiring means connecting one end of said rotor to one end of said winding and the other end of said rotor to said tap.

References Cited in the file of this patent

UNITED STATES PATENTS

| 2,619,526 | Willman | Nov. 25, 1952 |
| 2,837,718 | Catherall | June 3, 1958 |

FOREIGN PATENTS

| 708,476 | Great Britain | May 5, 1954 |